Figure 1:
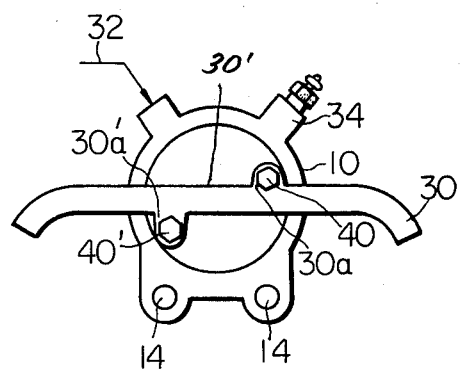

United States Patent [19]
Shimizu

[11] 3,917,034
[45] Nov. 4, 1975

[54] CLOSED LOOP TYPE DISC BRAKE ASSEMBLY

[75] Inventor: Kazuaki Shimizu, Yokosuka, Japan

[73] Assignee: Nissan Motor Company Limited, Yokohama, Japan

[22] Filed: May 6, 1974

[21] Appl. No.: 467,502

[30] Foreign Application Priority Data
May 7, 1973 Japan.............................. 48-52625

[52] U.S. Cl. ............................................. 188/73.4
[51] Int. Cl.²........................................ F16D 55/228
[58] Field of Search........................... 188/72.5, 73.4

[56] References Cited
UNITED STATES PATENTS

| | | | |
|---|---|---|---|
| 3,251,436 | 5/1966 | Afanador et al................... | 188/72.5 |
| 3,554,333 | 1/1971 | Hoenick et al. .................... | 188/72.5 |
| 3,608,678 | 9/1971 | Kobayashi........................... | 188/73.4 |
| 3,712,422 | 1/1973 | Haraikawa et al................. | 188/72.5 |

FOREIGN PATENTS OR APPLICATIONS

| | | | |
|---|---|---|---|
| 1,002,558 | 8/1965 | United Kingdom................ | 188/73.4 |
| 1,270,684 | 7/1961 | France............................... | 188/73.4 |

Primary Examiner—Trygve M. Blix
Assistant Examiner—Edward R. Kazenske

[57] ABSTRACT

Two pistons move in axially opposite directions within a common cylinder to engage the brake pads of the brake with the disc. One piston directly engages one brake pad and the other piston moves the other brake pad through a yoke. The improvement is that the yoke has a pair of flanges at a portion adapted to be contacted with the other piston, which flanges are fixed to the other piston by bolts.

2 Claims, 2 Drawing Figures

U.S. Patent  Nov. 4, 1975  3,917,034

CLOSED LOOP TYPE DISC BRAKE ASSEMBLY

The present invention relates to a floating caliper type disc brake for a motor vehicle.

In the prior part, a disc brake is well known to have a disc rotatable with a vehicle wheel, a cylinder rigidly mounted relative to the disc, first and second pistons sealingly slidable within the cylinder forming therebetween a variable volume chamber, a first brake pad disposed between the first piston and the disc and movable into braking engagement with the disc by the first piston, a second brake pad arranged to brakingly engage the opposite side of the disc opposite, and a yoke connecting the second brake pad to the second piston. When the vehicle driver depresses the brake pedal, fluid under pressure is fed from a brake master cylinder into the disc brake chamber to move the pistons in opposite directions to move the brake pads into braking engagement with the disc. The overall configuration is generally referred to as a floating caliper disc brake, with the caliper constituted by the yoke.

In the prior art, however, the yoke is connected to the second piston by a resilient member. Due to a mechanical hysterisis phenomenon, the second piston tends to become less responsive to the resilient member, and a gap is created which requires the driver to depress the brake pedal farther after the disc brake has been operated for some time than when the brake was new. Also, if the brake is subjected to severe operation for some period of time, the resilient member, which is generally mmade of a synthetic resin may melt resulting in a failure of the disc brake and a possible tragic accident of the motor vehicle.

It is therefore an important object of the present invention to provide a disc brake which eliminates the above described potentially unsafe configuration of the prior art.

It is another important object of the present invention to provide a disc brake which can withstand higher temperature operation than prior art disc brakes.

It is another important object of the present invention to provide a disc brake for a motor vehicle in which a caliper or yoke is rigidly connected to a piston of a fixed cylinder.

It is another important object of the present invention to provide a disc brake for a dual brake system in which an orifice communicating with a hydraulic brake line and a vent to discharge air may be formed in the bottom wall of a piston.

Figure 2:
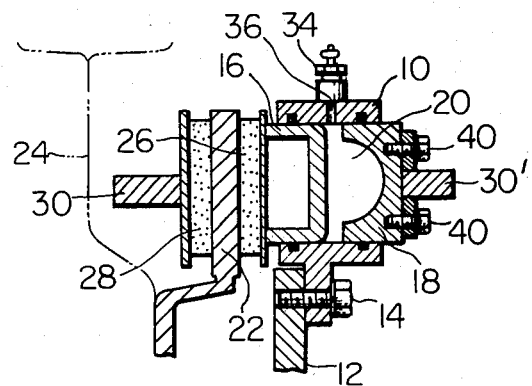

The above and other objects, features and advantages of the present invention will become more apparent from the following detailed description taken in conjuction with the accompanying drawing, in which:

FIG. 1 is a partial elevation view of a disc brake for a motor vehicle embodying the present invention; and FIG. 2 is a longitudinal sectional view of the disc brake of FIG. 1.

Referring now to the drawing, a disc brake for a motor vehicle embodying the present invention includes a cylinder 10 fixed to a structural member 12 of the vehicle body by means of bolts 14. An inner or first piston 16 and an outer or second piston 18 are axially tightly fitted and slidable within the cylinder 10 and form therebetween a variable volume chamber 20. A brake disc 22 is mounted for rotation with a wheel 24 of the vehicle to brake the wheel. The first piston 16 engages a first or directly actuated brake shoe assembly or pad 26 to move the pad into braking engagement with the brake disc 22. The second piston 18 is connected to a second or indirectly actuated brake shoe assembly or pad 28 by means of a floating caliper or yoke 30. In FIG. 2 the yoke 30 is shown as cut away for clarity of illustration. A brake master cylinder (not shown) is actuated by a brake pedal to introduce fluid under pressure into the chamber 20 through a line 32, a fitting 34 and an orifice 36. The fitting 34 serves as a vent to discharge air. Pressurized fluid in the chamber 20 causes the first and second pistons 16 and 18 to move to the left and the right respectively as shown in FIG. 2 to move the first and second brake pads 26 and 28 respectively into braking engagement with the brake disc 22. In the prior art, the second pad 28 through the yoke 30 is connected to the second piston 18 by a resilient member, with the accompanying described problems. The present invention, however, contemplates to rigidly connect the yoke 30 to the second piston 18 by means of a pair of flanges 30a, 30a' formed on the yoke 30 and bolts 40, 40'. The pair of flanges 30a, 30a' extend perpendicularly to and in opposite directions from the surfaces of a portion 30' of the yoke 30 and are symmetrically fixed to a bottom outer face of the second piston 18. As shown in FIG. 2, each bolt 40 passes through a hole (no numeral) formed through the yoke 30 and screwably engages the second piston 18 in a threaded hole (no numeral) bored in the right end face of the second piston 18. With this configuration, it is clear that the disadvantages attendant with connecting the yoke 30 and second piston 18 by a resilient member are completely eliminated. Especially, since the bolts 40, 40' may be formed of a metal such as, for example, iron or steel, the melting point of the means connecting the yoke 30 to the second piston 18 is substantially higher than in case of connecting the yoke 30 to the second piston 18 by a resilient member formed of any synthetic resin. Thus, a disc brake of the invention is able to provide reliable braking under much higher temperature operation which might occur under severe operating conditions. Thus, the chance of a tragic accident which might be caused by brake failure under severe operating conditions is greatly reduced by a disc brake of the invention.

What is claimed is:

1. In a disc brake for wheeled vehicle including a rotatable brake disc, a stationary hydraulic cylinder having first and second pistons slidable in opposite directions which are substantially parallel to the axis of said brake disc, said pistons defining a fluid chamber therebetween into which pressurized fluid is supplied when a braking action is initiated, first and second brake pads positioned adjacent to opposite faces of said brake disc, said first brake pad being in abutting engagement with said first piston and thereby forced against said brake disc when said first piston is moved by said pressurized fluid, and a yoke being generally flat in shape and movable in a direction parallel to said axis of said brake disc by said second piston to move said second brake pad, the improvement in that said yoke has first and second flange portions at a portion thereof adapted to be contacted with a bottom outer face of said second piston, said first and second flange portions extending perpendicularly to and in opposite directions from the surface of the yoke and being symmetrically fixed to said bottom outer face by means of bolts.

2. The improvement as claimed in claim 1, in which said first and second flange portions are integral with said yoke and spaced to each other.

* * * * *